Dec. 3, 1935.    C. E. KILBOURNE    2,023,326
STARTING SYSTEM FOR ALTERNATING CURRENT MOTORS
Filed Nov. 18, 1933
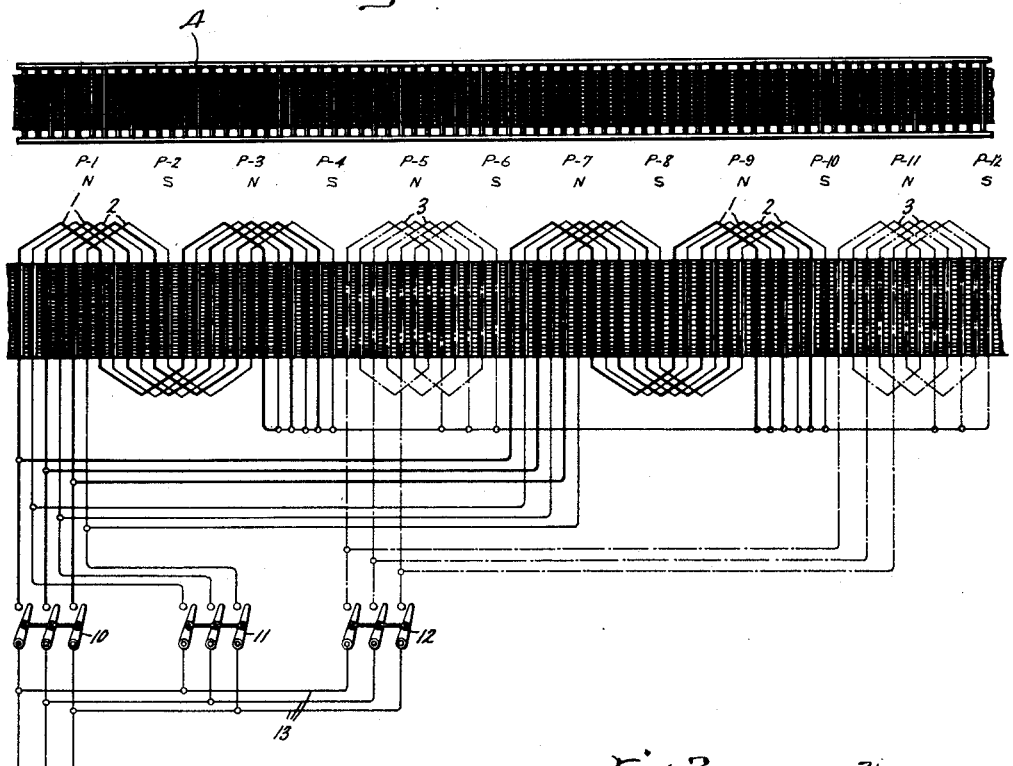
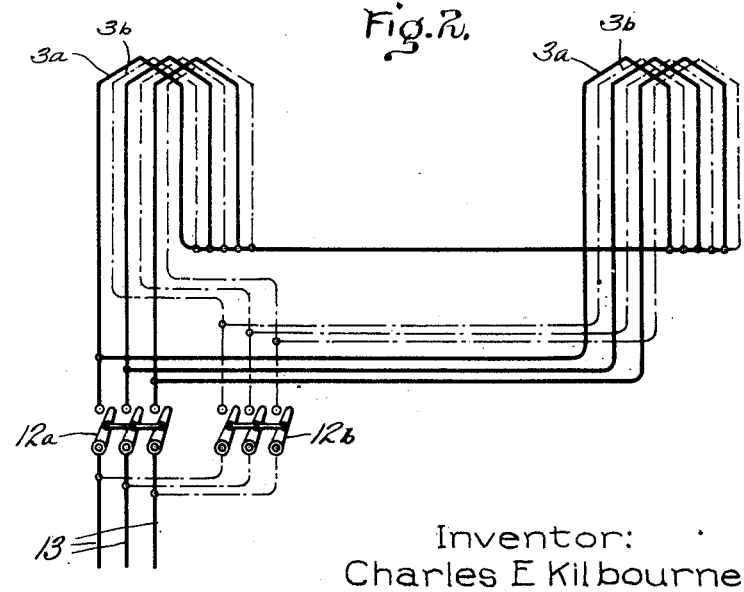
Inventor:
Charles E Kilbourne,
by Harry E. Dunham
His Attorney.

Patented Dec. 3, 1935

2,023,326

UNITED STATES PATENT OFFICE 2,023,326

STARTING SYSTEM FOR ALTERNATING-CURRENT MOTORS

Charles E. Kilbourne, Schenectady, N. Y., assignor to General Electric Company, a corporation of New York Application November 18, 1933, Serial No. 698,628

11 Claims. (Cl. 172—274)

My invention relates to starting systems for alternating-current motors and its object is to provide an improved arrangement and method for starting polyphase motors. While my invention is particularly applicable for starting synchronous motors, it may be used to start any other type of polyphase machine such as a synchronous converter, an induction motor, etc.

In my copending application, Serial No. 698,-627, filed November 18, 1933, I have disclosed and claimed an improved arrangement for starting a polyphase motor which consists in first energizing diametrically opposite substantially equal groups of adjacent poles and then increasing the number of poles in each of these two groups to give the desired torque and current inputs during the starting operation. The arrangement disclosed in the above-mentioned copending application is especially adapted for starting motors having a large number of poles. When it is used to start a motor having a small number of poles such, for example, as an 8- or 12-pole machine, the number of poles which can be connected in one of the diametrically opposite starting groups is so small that the harmonics produced in the magnetic field of the motor are in some cases of such values as to produce undesirable dips in the motor torque characteristic. In accordance with my present invention, I overcome this difficulty by first energizing two larger diametrically opposite groups but only a portion of the windings forming each of the poles in these two groups. For example, assume it is desired to start a 12-pole machine by first energizing a third of the winding, then two-thirds of the winding and then all of the winding. According to the arrangement disclosed in the above-mentioned copending application, the preferred arrangement would be to energize the windings forming two diametrically opposite groups of two poles, then energizing the windings forming two poles adjacent to each of the diametrically opposite groups so that each group contains 4 poles and then finally energizing all of the remaining armature windings of the machine. In accordance with my present invention, I would start such a motor by first energizing half the coil groupings forming each pole of a group of four adjacent poles and half of the coil groupings forming each pole of the diametrically opposite group of four adjacent poles. Then I would energize all of the coil groupings forming both groups of poles and then finally all of the remaining coil groupings of the machine.

While my improved arrangement may not give as good a torque efficiency as the arrangement disclosed in my prior application, it does eliminate more of the subsynchronous harmonics in the magnetic field which may in some cases cause the motor to stall at a subsynchronous speed during the starting operation.

My invention will be better understood from the following description when taken in connection with the accompanying drawing, Fig. 1 of which diagrammatically illustrates a development on a plane surface of the windings for a 12-pole polyphase motor and suitable switching means for starting such a motor in accordance with my invention, and Fig. 2 of which diagrammatically illustrates a modification of a portion of the primary winding shown in Fig. 1 and its scope will be pointed out in the appended claims.

In the accompanying drawing I have shown an arrangement embodying my invention for operating the 12-pole polyphase motor with one-third of the motor armature winding energized, with two-thirds of the motor armature winding energized and with all of the motor armature winding energized.

In order to simplify the disclosure I have shown a two-slot per pole per phase arrangement. Therefore a 72-slot machine is shown. It will be understood however that my invention is not limited to any particular integral or fractional slot per pole per phase arrangement or to any particular coil pitch.

In the particular arrangement shown in the accompanying drawing, the 12-pole motor is provided with three polyphase primary windings 1, 2, and 3, each of which comprises approximately a third of the total primary winding. The windings 1 and 2 are shown as having their corresponding coil sides in alternate slots under each pole of two diametrically opposite groups of four adjacent poles each, and the winding 3 is shown as occupying all of the slots under the other four poles. Suitable switches 10, 11, 12 are provided for respectively connecting the windings 1, 2, and 3 to a suitable polyphase supply circuit 13. The secondary winding of the motor is shown as a squirrel cage winding 4.

When it is desired to start the motor first, either switch 10 or 11 may be closed and then the other of these two switches is closed and finally the switch 12 is closed. For the purpose of this description, it will be assumed that the switch 10 is closed first. When the switch 10 is closed, the winding 1 is energized to form two diametrically opposite groups of four adjacent poles. It will be noted that although only one-third of the total armature winding is energized, nevertheless eight poles or two-thirds of the total number are formed by this single winding. When the switch 11 is closed the winding 2 is energized to increase the torque of the motor. No increase however in the number of poles produced is effected by the closing of the switch 11. When the switch 12 is closed, the winding 3 is energized to increase the torque by energizing the remaining four poles of the machine.

I find that this arrangement of starting a 12-pole polyphase machine produces a better torque characteristic than either an arrangement in which first a winding forming two diametrically opposite groups of two adjacent poles is energized, then a winding forming two poles adjacent to each group is energized, and finally a winding forming the remaining four poles is energized, or an arrangement in which three armature windings having corresponding coil sides under every pole of the machine are successively energized.

While I have shown manually controlled switches 10, 11, and 12 for connecting the windings 1 to 3 inclusive to the polyphase supply circuit, it will be evident to those skilled in the art that any suitable automatic means may be employed for effecting the operation of these switches in the proper sequence and at the proper time. For example, any suitable time- or speed-controlled means, examples of which are well known in the art, may be employed for controlling the closing of the switches 11 and 12. Also it will be evident to those skilled in the art that if the machine is a synchronous machine, suitable means, examples of which are well known in the art, will be provided for connecting the field winding of the machine to a suitable source of excitation at the proper time during the starting operation.

While I have shown the winding 3 as occupying all of the slots under four of the poles, it is evident that these four poles may be formed by any other well-known type of winding. For example, as shown in Fig. 2 this single winding may be replaced by two windings 3a and 3b having their corresponding coil sides respectively in alternate slots under each of the four poles and separate switches 12a and 12b for respectively connecting these two windings 3a and 3b to the polyphase supply circuit 13. With such an arrangement it would be possible to obtain another step by closing one of these additional switches after the switches 10 and 11 have been closed so as to operate the motor with 5/6 of the armature winding energized.

Also it will be obvious that my invention may be used in cases where it is desirable to start a motor having such a small number of poles that it would not be practical to energize two diametrically opposite substantially equal groups of poles. For example, in the case of a 6-pole motor which is to be started with one-third of the winding energized, then two-thirds and then finally all of the winding energized, it might be impractical because of dips in the torque characteristics to start such a motor by energizing two diametrically opposite poles. In accordance with my invention, I would provide the motor with three separate armature windings each of which occupies substantially one-third of the total number of slots, two of these windings occupying alternate slots under each pole of a group of four adjacent poles and the third winding being arranged in the remaining slots in any suitable manner so as to form the remaining two poles. Such a result may be obtained by arranging these three armature windings under the six holes of the motor in the same manner that the armature windings 1, 2, and 3 are arranged under poles P—1 to P—6, inclusive, in Fig. 1. With such an arrangement the motor would be started by energizing one of the two windings which occupy alternate slots under each pole of the group of four poles. Then the other of these two windings would be energized and finally the third winding would be energized.

While I have, in accordance with the Patent Statutes, shown and described my invention as applied to particular systems and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. The method of starting a polyphase machine having a plurality of polyphase primary windings having corresponding coil sides under each pole of a group of adjacent poles, said group comprising less than the total number of poles, and an additional primary winding for producing one of the remaining poles of the machine which consists in successively energizing the windings constituting said plurality of polyphase primary windings, and then energizing said additional primary winding.

2. The method of starting a polyphase machine having a plurality of polyphase primary windings having corresponding coil sides under each pole of a group of adjacent poles, said group comprising less than the total number of poles, and additional primary windings for producing the remaining poles of the machine which consists in successively energizing the windings constituting said plurality of polyphase primary windings, and then energizing said additional primary windings.

3. The method of starting a polyphase machine having a plurality of polyphase primary windings having corresponding coil sides under each pole of a group of adjacent poles, said group comprising less than the total number of poles, and an additional primary winding for producing one of the remaining poles of the machine which consists in first energizing a portion of the windings constituting said plurality of polyphase primary windings, then energizing all of said polyphase primary windings, and then energizing said additional primary winding.

4. The method of starting a polyphase machine having a plurality of polyphase primary windings having corresponding coil sides under each pole of a group of adjacent poles, said group comprising less than the total number of poles, and additional primary windings for producing the remaining poles of said machine which consists in first energizing a portion of said plurality of polyphase primary windings, then energizing all of said polyphase primary windings, and then energizing said additional primary windings.

5. The method of starting a polyphase machine having a plurality of polyphase primary windings with corresponding coil sides in different slots under each pole of a group of adjacent poles, said group comprising less than the total number of poles of the machine and other windings for forming the remaining poles of the machine, which consists in first energizing said polyphase windings in a predetermined order until all of them are energized, and then energizing in addition said other windings in a predetermined manner.

6. The method of starting a polyphase machine having a plurality of polyphase primary windings having corresponding coil sides under each pole of two diametrically opposite groups of adjacent poles, said two groups of poles comprising less than the total number of poles of the machine, and another primary winding for producing one of the remaining poles of the machine which consists in successively energizing the windings constituting said plurality of polyphase primary windings, and then energizing said additional primary winding.

7. The method of starting a polyphase machine having a plurality of polyphase primary windings having corresponding coil sides under each pole of two diametrically opposite groups of adjacent poles, said two groups of poles comprising less than the total number of poles of the machine, and additional primary windings for producing the remaining poles of the machine which consists in first energizing a portion of said plurality of polyphase primary windings, then energizing all of said polyphase primary windings and then energizing said additional primary windings.

8. In combination a polyphase machine having a plurality of polyphase windings each of which has a coil side under each pole of a group of adjacent poles only and another winding having a coil side under another pole of said machine, a supply circuit, and means for respectively connecting said windings to said supply circuit.

9. In combination, a polyphase machine comprising a plurality of polyphase windings having corresponding coil sides under each pole of a group of adjacent poles, said group comprising less than the total number of poles of the machine, a supply circuit, means for respectively connecting said windings to said supply circuit, other polyphase windings and means including said other polyphase windings for producing the remaining poles of said machine.

10. In combination, a polyphase machine having a plurality of polyphase windings with corresponding coil sides in different slots under each pole of a group of adjacent poles comprising less than the total number of poles and another winding in all of the slots under the remaining poles, a polyphase supply circuit and means for respectively connecting said windings to said supply circuit.

11. In combination, a polyphase machine having a plurality of polyphase windings, each of which has a coil side under each pole of two diametrically opposite groups of adjacent poles, said two groups comprising less than all of the poles of said machine, a polyphase supply circuit, means for respectively connecting said windings to said supply circuit, windings on said machine for forming the remaining poles of said machine, and means for connecting said last-mentioned windings to said supply circuit after said first-mentioned windings are connected thereto.

CHARLES E. KILBOURNE.